(12) United States Patent
Velardo

(10) Patent No.: US 12,046,015 B2
(45) Date of Patent: Jul. 23, 2024

(54) APPARATUS AND METHOD FOR IMAGE CLASSIFICATION

(71) Applicant: Proposal Pickleball Inc., Wilmington, MA (US)

(72) Inventor: David Velardo, Wilmington, MA (US)

(*) Notice: Subject to any disclaimer, the term of this patent is extended or adjusted under 35 U.S.C. 154(b) by 0 days.

(21) Appl. No.: 18/205,639

(22) Filed: Jun. 5, 2023

(65) Prior Publication Data

US 2023/0351718 A1 Nov. 2, 2023

Related U.S. Application Data

(63) Continuation of application No. 17/942,556, filed on Sep. 12, 2022, now Pat. No. 11,704,892.

(60) Provisional application No. 63/247,094, filed on Sep. 22, 2021.

(51) Int. Cl.
*G06K 9/00* (2022.01)
*G06V 10/40* (2022.01)

(52) U.S. Cl.
CPC .................................. *G06V 10/40* (2022.01)

(58) Field of Classification Search
CPC .............................. G06V 10/40; G06V 20/42
See application file for complete search history.

(56) References Cited

U.S. PATENT DOCUMENTS

| | | | | |
|---|---|---|---|---|
| 7,515,735 B2* | 4/2009 | Miyamori | ................. | G06T 7/20 382/103 |
| 7,590,286 B2* | 9/2009 | Miyamori | ............. | G06V 40/20 348/169 |
| 10,163,042 B2* | 12/2018 | Cheng | ..................... | G06V 20/30 |
| 11,704,892 B2* | 7/2023 | Velardo | ................... | G06V 20/42 |
| 2002/0018594 A1* | 2/2002 | Xu | ........................ | G06V 20/40 382/173 |
| 2007/0104368 A1* | 5/2007 | Miyamori | ................. | G06T 7/20 382/181 |
| 2011/0273576 A1* | 11/2011 | Zambetti | ................ | H04N 23/63 348/222.1 |
| 2014/0315610 A1* | 10/2014 | Shachar | .................... | G06T 7/20 463/7 |

(Continued)

FOREIGN PATENT DOCUMENTS

| | | | | |
|---|---|---|---|---|
| ES | 2680393 A1 * | 9/2018 | ........... | A63B 1/0605 |
| WO | WO-2006103662 A2 * | 10/2006 | ............. | G06T 7/292 |

(Continued)

OTHER PUBLICATIONS

Learning to Track and Identify Players from Broadcast Sports Videos, Wei-Lwun Lu et al., IEEE, 2013, pp. 1704 to 1716 (Year: 2013) (Year: 2013).*

(Continued)

*Primary Examiner* — Jayesh A Patel
(74) *Attorney, Agent, or Firm* — Caldwell Intellectual Property Law

(57) ABSTRACT

An image classification system for tracking a net sport is illustrated. The system includes a visual device configured to capture video footage of a match. The computing device is communicatively connected to the visual device and is configured to receive the video footage of the match from the visual device, translate video footage of the match from the visual device into a data representation by logging an event with a timestamp, and display data representation to a user.

20 Claims, 9 Drawing Sheets

(56) References Cited

U.S. PATENT DOCUMENTS

| | | | | |
|---|---|---|---|---|
| 2017/0177930 A1* | 6/2017 | Holohan | ................ | G06T 7/251 |
| 2018/0350084 A1* | 12/2018 | Tamir | ..................... | G06T 7/292 |
| 2019/0164298 A1* | 5/2019 | Balish | ..................... | G06T 7/254 |
| 2019/0244029 A1* | 8/2019 | Cao | ..................... | H04N 19/164 |
| 2019/0287310 A1* | 9/2019 | Kopeinigg | ............. | G06V 20/42 |
| 2020/0279398 A1* | 9/2020 | Sha | ..................... | G06V 10/454 |
| 2022/0108112 A1* | 4/2022 | Ottenwess | ............... | G06N 3/08 |

FOREIGN PATENT DOCUMENTS

| | | | | |
|---|---|---|---|---|
| WO | WO-2011085008 A1 * | 7/2011 | ......... | A63B 24/0021 |
| WO | WO-2013124856 A1 * | 8/2013 | ............ | A63B 71/02 |
| WO | WO-2016157152 A1 * | 10/2016 | ........... | G01S 3/7864 |
| WO | WO-2017100465 A1 * | 6/2017 | ........... | A63B 63/007 |
| WO | WO-2021016901 A1 * | 2/2021 | ........... | A63F 13/213 |

OTHER PUBLICATIONS

Efficiently Scaling up Crowdsourced Video Annotation, Carl Vondrick et al., Int J Comput Vis, 2013, pp. 184-204 (Year: 2013).*
Real-Time Camera Anomaly Detection for Real-World Video Surveillance, Yuan-Kai Wang et al., IEEE. 2011, pp. 1520-1525 (Year: 2011).*
An intelligent strategy for the automatic detection of highlights in tennis video recordings, Yo-Ping Huang et al., Elsevier, 2009, pp. 9907=9918 (Year: 2009).*
An Improved Ball Pivot Algorithm-Based Ground Filtering Mechanism for LiDAR Data, Wei Ma et al, MDPI, 2019, pp. 1-16 (Year: 2019).*

* cited by examiner

APPARATUS AND METHOD FOR IMAGE CLASSIFICATION

CROSS-REFERENCE TO RELATED APPLICATIONS

This application is a continuation of U.S. Nonprovisional patent application Ser. No. 17/942,556 filed on Sep. 12, 2022, and entitled "AN APPARATUS AND METHOD FOR IMAGE CLASSIFICATION", which claims the benefit of priority of U.S. Provisional Patent Application Ser. No. 63/247,094 filed on Sep. 22, 2021, and entitled "AN IMAGE CLASSIFICATION SYSTEM FOR TRACKING A NET SPORT", all of which are incorporated by reference herein in their entirety.

FIELD OF THE INVENTION

The present invention generally relates to the field of computer vision. In particular, the present invention is directed to an apparatus and method for image classification.

BACKGROUND

It can be hard to keep track of a ball during sports play, especially those with a net, since movement may be rapid, and the ball can be small. Having computer vision to help track aspects and statistics of the sport may allow for smoother and safer play.

SUMMARY OF THE DISCLOSURE

In an aspect, an apparatus for image classification of moving objects is provided. The apparatus includes a processor and a memory communicatively connected to the processor. The memory containing instructions configuring the processor to receive a net sport match video footage of a plurality of moving objects from a visual device, wherein the plurality of moving objects comprises at least a ball and one or more players, detect an event in the video footage, wherein the event comprises a collision, determine the one or more players of the plurality of moving objects, and display a data representation of the event to a user.

In another aspect, a method for image classification of moving objects. The method includes receiving, by a processor, a net sport match video footage of a plurality of moving objects from a visual device, wherein the plurality of moving objects comprises at least a ball and one or more players. The method includes detecting, by the processor, an event in the video footage, wherein the event comprises a collision. The method includes determining, by the processor, the one or more players of the plurality of moving objects. The method includes displaying, by the processor, a data representation of the event to a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In an aspect, an image classification system for tracking a net sport are provided. In one or more embodiments, artificial intelligence and computer vision techniques may be used to track the ball and when it makes contact with something in the video footage. Computer vision techniques may be used to track various aspects of the net sport match through the visual device. Artificial intelligence may be used to identify the ball, players, serve, and so on by recognizing the actions performed based on training sets illustrating various aspects of the net sport being played.

Figure 1:
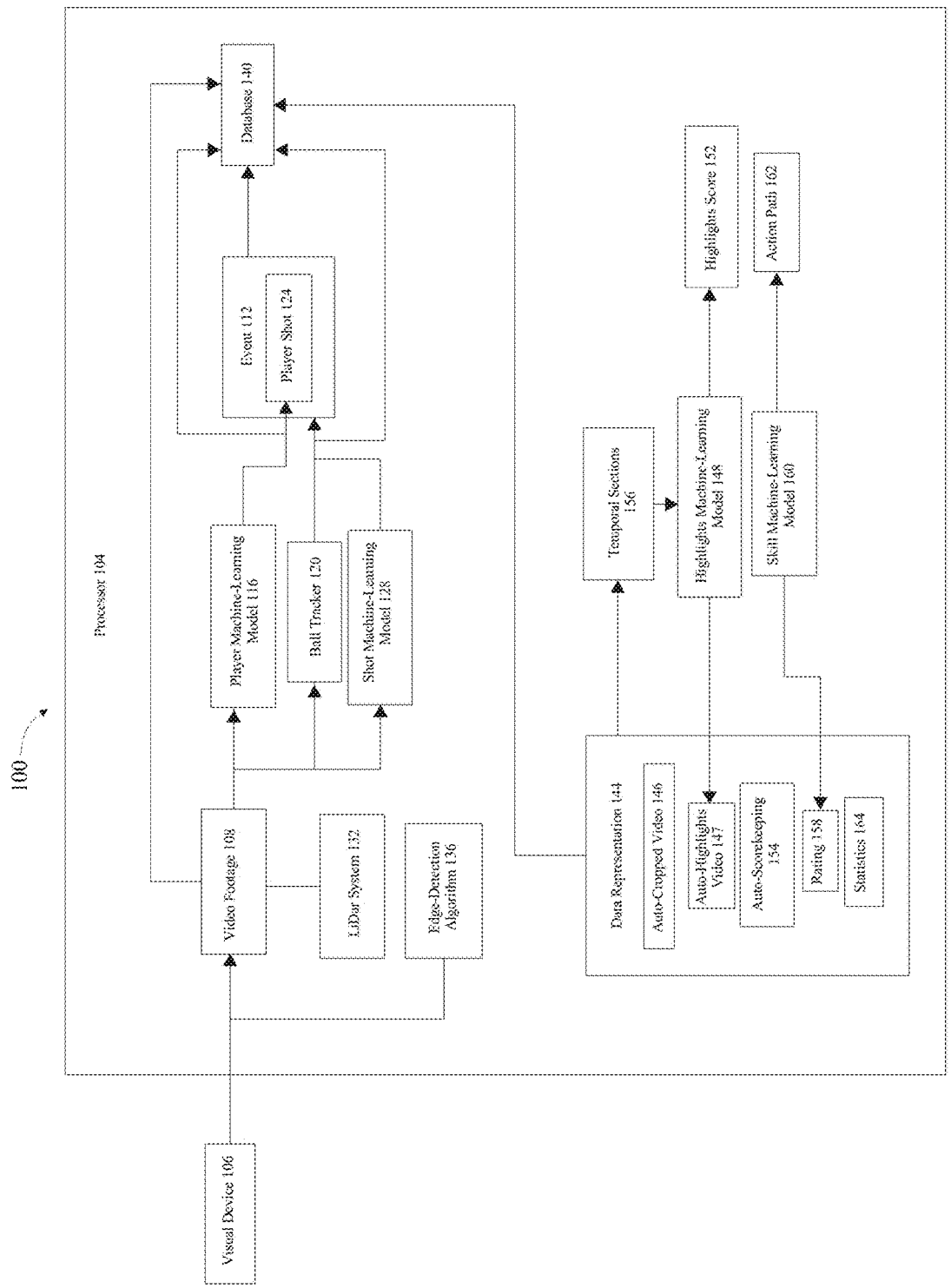
FIG. 1 is a block diagram illustrating an exemplary embodiment of an image classification apparatus for moving objects.

Now referring to FIG. 1, an exemplary embodiment of an apparatus 100 for image classification of moving objects is illustrated. Moving objects may be moving objects in a net sport. In this disclosure, a "net sport" is any sport or game that involves a net, ball, and players on at least a side of the net playing the sport. Such net sports may include tennis, badminton, pickleball, table tennis, volleyball, roundnet, or the like. Also, in this disclosure, a "match" is an organized round of playing a particular net sport. There may be collisions between moving objects such as a ball and objects such as a racquet, a player, a net, or the like.

Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, processor 104 may be communicatively connected to a visual device 106. As used in this disclosure an "visual device" denotes any device, module, and/or subsystem, utilizing any hardware, software, and/or any combination thereof to detect visual events and transmit the information. For example, and without limitation, visual device 106 may include a LIDAR system, an imager, a machine-vision system, any sort of camera system, including a monocular, omnidirectional, multispectral, or panoramic camera, any sort of sensor, including a potentiometric sensor, inductive sensor, capacitive sensor, piezoelectric sensor, strain gauge sensor, variable reluctance sensor, environmental sensor, electro-optic sensor, and the like thereof. Visual device 106 may include a camera. A "camera," for the purposes of this disclosure, is an optical device or combination of optical devices that is configured to capture a field of vision as an electrical signal, to form a digital image. Camera may include a single camera and/or two or more cameras used to capture field of vision. Camera may capture a feed including a plurality of frames, such as without limitation a video feed. Visual device 106 may include any computing device as described herein, and in reference to FIG. 8, including without limitation a microcontroller, microprocessor, digital signal processor (DSP) and/or system on a chip (SoC). Visual device 106 may include, be included in, and/or communicate with a mobile device such as a mobile telephone or smartphone. Visual device 106 may include a single computing device operating independently, or may include two or more computing devices operating in concert, in parallel, sequentially or the like; two or more computing devices may be included together in a single computing device or in two or more computing devices. Visual device 106 with one or more additional devices as described below in further detail via a network interface device. Network interface device may be utilized for connecting a visual device 106 one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. Visual device 106 may include one or more computing devices dedicated to data storage, security, distribution of traffic for load balancing, and the like. Visual device 106 may distribute one or more computing tasks as described below across a plurality of computing devices of computing device, which may operate in parallel, in series, redundantly, or in any other manner used for distribution of tasks or memory between computing devices. Visual device 106 may be implemented using a "shared nothing" architecture in which data is cached at the worker, in an embodiment, this may enable scalability of apparatus 100 and/or computing device. Visual device 106 may be a user device such as a phone, tablet, laptop or the like. Visual device 106 may be a camera, video camera, or the like. Visual device 106 may be communicatively connected to processor 104. For example, a camera, phone, or the like may be wirelessly (or wired) connected to processor 104.

As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

As a non-limiting example, and with continued reference to FIG. 1, processor 104 may be configured to receive video footage 108 from a visual device 106. As used herein, "video footage" is data received from a visual device. In some embodiments, video footage may include raw and/or unedited material. Video footage 108 may include a plurality of images. Video footage 108 may include at least a digital image, either taken using a digital camera or converted to a digital image from a non-digital photographic form using, without limitation, a camera, scanner, or other optical device for image conversion and/or capture, and/or a sequence of such digital images. Video footage 108 may include a plurality of digital images, each representing a time slice. Digital images may be "frames" of a video. Video footage 208 may display 24 frames per second, 30 frames per second, 70 frames per second, or the like. Video footage 208 may include a video capture of a net sport match of a net sport. For example, but without limitation, visual device 106 may capture a video footage 108 of a pickleball net sport match being played. In another embodiment, visual device 106 may capture a video footage 108 of a soccer match, tennis match, badminton match, or the like. Video footage 108 may be a video of a match from a side-view, back-view, corner-view, top-view, or the like. A "side-view", as used herein, is a view from either end of a net, in the case of a net sport match. A "back-view", as used herein, is a view from behind a player of a net sport match. A "corner-view", as used herein, is a view from a corner of the net sport match court. A "top-view" is a view from above. Video footage 108 may include a video of only one view. Alternatively, or additionally, video footage 108 may include a plurality of videos from multiple views. Video footage 108 may be captured by a visual device 106 handheld by a person. Visual device 106 may also be set up on a tripod.

Video footage 108 may include a video. Digital video may be compressed to optimize speed and/or cost of transmission of video. Videos may be compressed according to a video compression coding format (i.e., codec). Exemplary video compression codecs include H.26× codecs, MPEG formats, VVC, SVT-AV1, and the like. In some cases, compression of a digital video may be lossy, in which some information may be lost during compression. Alternatively, or additionally, in some cases, compression of a digital video may be substantially lossless, where substantially no information is lost during compression.

Continuing to reference FIG. 1, processor 104 is configured to detect an event 112 in the video footage 108 of the moving objects. For the purposes of this disclosure, "moving objects" are objects that are in motion. Moving objects may include players moving, balls moving, racquets moving, and the like. As used herein, an "event" is an incident recorded by visual device 106. An event 112 may include a collision. As used herein, a "collision" is when two or more objects make contact with each other. An event 112 may include a collision between a ball and another object. Collisions may include a ball making contact with the ground, a paddle/racket, a net, a player, or the like. An event 112 may be based on the perspective of a ball. As a non-limiting example, a racket colliding with another racket would not be considered an event 112. However, a racket colliding with a ball or a ball colliding with a racket may be considered an event 112. A player may include any person participating in/moving in the video footage 108. A player may be a person participating in the match recorded in video footage 108. Additionally or alternatively, an event 112 may be a net event, wherein a ball hits a net. A net may be located in the middle of the court, and processor 104 may identify the middle of the court. In an embodiment, a net event may be determined when a ball is traveling across the court and drops vertically down at the center of the court. Additionally, or alternatively, an event 112 may further include a "player shot" event. A player shot event may be an event where a player hits a ball. Collisions may be tracked by tracking the position of a ball and a player.

Still referring to FIG. 1, an event 112 may be detected by comparing a series of frames to determine movement of various objects within a raw video in video footage 108. In some embodiments, comparing series of frames may include video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression is either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Compression is useful because it reduces the resources required to store and transmit data. Computational resources are consumed in the compression and decompression processes. Data compression is subject to a space–time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

Still referring to FIG. 1, inter-frame coding works by comparing each frame in the video with the previous one. Individual frames of a video sequence are compared from one frame to the next, and the video compression codec sends only the differences to the reference frame. If the frame contains areas where nothing has moved, the system can simply issue a short command that copies that part of the previous frame into the next one. If sections of the frame move in a simple manner, the compressor can emit a (slightly longer) command that tells the decompressor to shift, rotate, lighten, or darken the copy. Usually, the encoder will also transmit a residue signal which describes the remaining more subtle differences to the reference imagery. Using entropy coding, these residue signals have a more compact representation than the full signal. In areas of video with more motion, the compression must encode more data to keep up with the larger number of pixels that are changing. As used in this disclosure, reference frames are frames of a compressed video (a complete picture) that are used to define future frames. As such, they are only used in interframe compression techniques. Some modern video encoding standards, such as H.264/AVC, allow the use of multiple reference frames. This allows the video encoder to choose among more than one previously decoded frame on which to base each macroblock in the next frame. While the best frame for this purpose is usually the previous frame, the extra reference frames can improve compression efficiency and/or video quality. The two frame types used in inter-fame coding is P-frames and B-frames. A P-frame (Predicted picture) holds only the changes in the image from the previous frame. For example, in a scene where a car moves across a stationary background, only the car's movements need to be encoded. The encoder does not need to store the unchanging background pixels in the P-frame, thus saving space. A B-frame (Bidirectional predicted picture) saves even more space by using differences between the current frame and both the preceding and following frames to specify its content. An inter coded frame is divided into blocks known as macroblocks. A macroblock is a processing unit in image and video compression formats based on linear block transforms, typically the discrete cosine transform (DCT). A macroblock typically consists of 16×16 samples, and is further subdivided into transform blocks, and may be further subdivided into prediction blocks. Formats which are based on macroblocks include JPEG, where they are called MCU blocks, H.261, MPEG-1 Part 2, H.262/MPEG-2 Part 2, H.263, MPEG-4 Part 2, and H.264/MPEG-4 AVC. After the inter coded frame is divided into macroblocks, instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as motion vector, which points to the position of the matching block at the reference frame. The process of motion vector determination is called motion estimation. In most cases the encoder will succeed, but the block found is likely not an exact match to the block it is encoding. This is why the encoder will compute the differences between them. Those residual values are known as the prediction error and need to be transformed and sent to the decoder. To sum up, if the encoder succeeds in finding a matching block on a reference frame, it will obtain a motion vector pointing to the matched block and a prediction error. Using both elements, the decoder will be able to recover the raw pixels of the block. For example, video footage 108 may be compressed using a P-frame algorithm and broken down into macroblocks. Individual still images taken from video footage 108 can then be compared against a reference frame taken from a previous still image form video footage 108. A P-frame from video footage 108 would only hold the changes in image from the previous frame. For example, subtle changes such as a foreign object entering the background of the video, movement of people and objects in the video would be encoded and stored. Exemplary video compression codecs include without limitation H.26× codecs, MPEG formats, VVC, SVT-AV1, and the like. In some cases, compression may be lossy, in which some information may be lost during compression.

Alternatively, or additionally, in some cases, compression may be substantially lossless, where substantially no information is lost during compression. In some cases, image component 116a-b may include a plurality of temporally sequential frames. In some cases, each frame may be encoded (e.g., bitmap or vector-based encoding). Each frame may be configured to be displayed by way of a display. Exemplary displays include without limitation light emitting diode (LED) displays, cathode ray tube (CRT) displays, liquid crystal displays (LCDs), organic LEDs (OLDs), quantum dot displays, projectors (e.g., scanned light projectors), and the like.

Continuing to reference FIG. 1, processor 104 may be configured to determine players in video footage 108. In an embodiment, processor 104 may distinguish humans from other objects within video footage 108. Furthermore, processor 104 may distinguish a specific human, such as a player, from other humans within video footage 108. In an embodiment, video footage may include referees, ball kids, spectators, players, and the like. In an embodiment, processor 104 may use a player machine-learning model 116 to distinguish a player. Player machine-learning model 116 may be consistent with any machine-learning model as discussed herein. Player machine-learning model 116 may be a classifier model that may be trained with training data including labeled players from existing videos. For example, player machine-learning model 116 may be trained to classify a person as a player based on labeled features such as what the person is holding (i.e. a racquet), wherein the person is standing (i.e. in the ball court), and the like. A "classifier," as used in this disclosure is a machine-learning model, such as a mathematical model, neural net, or program generated by a machine learning algorithm known as a "classification algorithm" that sorts inputs into categories or bins of data, outputting the categories or bins of data and/or labels associated therewith. A classifier may be configured to output at least a datum that labels or otherwise identifies a set of data that are clustered together, found to be close under a distance metric, or the like. Player machine-learning model 116 may receive an input of video footage 108 and generate an output of classified players within video footage 108. Training data may include data from previous inputs and outputs of machine-learning model 116, such that machine-learning model 116 is iterative. Inputs and outputs from machine-learning model may be used for future iterations of the machine-learning model 116.

Additionally, processor 104/player machine-learning model 116 may track players throughout video footage 108. In an embodiment, processor 104 may use video analytics to determine a location of a player on the court. A "court" as used herein, is an area marked out for ball games. Often, courts are marked by white outlines. Processor 104 may use software, such as Open Pose, to determine a pose of a player, which may then be used to determine a location of a player on the court. A pose of a player may be a skeleton drawn over an image of a player within that frame of video, also called a player pose skeleton. As used herein, a "player pose skeleton" is a representation of the orientation of a person in graphical form. Essentially, player pose skeleton is a set of coordinates that can be connected to describe a pose of a person. The coordinates may be on joints of a person, such as coordinates on the elbow, shoulder, hips, knees, and the like. Skeleton may be similar to a stick figure. Pose may be used to define the positioning of a player's body, such that the position of the players upper-torso and legs, based on their movements on the court. Pose of a player may include positional stance of a specific player on the court. Based on the pose of a player and the view the video footage is recorded from, a single vector may be estimated. Single vector may represent the player location on a court. In an embodiment, the single vector may be displayed by processor 104 as a dot overlayed on a diagram/picture of the court. This schematic is shown in greater detail in FIG. 5B.

Still referring to FIG. 1, in some cases, processor 104 may perform pose-estimation, for example, to ascertain a relative location or movement of objects, such as players, within video footage 108 to include one or more transformations, for example to a view of a frame (or an image or existing video resumes) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; image recognition and/or edge detection software may be used to detect multiple views of images of an object (from subsequent frames) to derive a relative position along a third (z) axis. In some cases, solicitation video may include a stereo image, having two stereoscopic views, which may be compared to derive z-axis values of points on object permitting, for instance, derivation of further z-axis points within and/or around the object using interpolation. Alternatively, or additionally, relative movement within Image component 116 (e.g., frame to frame) may be used to ascertain positions of objects, even along a z-axis, for instance by way of kinetic parallax. In some cases, relative motion of objects further away may occur at a different speed than objects nearby, this phenomenon may be used to ascertain a position of objects relative a camera, for example when the camera is moving. Object recognition and pose estimation may be repeated with multiple objects in field of view, including without a subject. In an embodiment, x and y axes may be chosen to span a plane common to a field of view of a camera used for solicitation video image capturing and/or an xy plane of a first frame; a result, x and y translational components and q may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, in an embodiment, processor 104/player machine-learning model 116 may use human re-identification code to track individual players throughout video footage 108. As used herein, "human re-identification" is the task of associating images of the same person taken from different angles and/or cameras. Human re-identification code may be used to identify and track unique players throughout video footage 108. As a non-limiting example, pickleball has four unique players in a given game. Processor 104 may identify the four unique players and track them separately through video footage 108. In an embodiment, processor 104 may assign a unique identifier for each player. Identifier may be a unique ID number, a color, name, or the like. Processor 104 may display each player a different colored dot on an overlay diagram of the court, as discussed above, and shown in greater detail in FIG. 3. Human re-identification code may be open source code that detects a person and establishes correspondence between detected people across frames. Human re-identification code may use machine-learning models, such as those discussed herein like deep learning, classifiers, and the like to identify unique players.

With continued reference to FIG. 1, human re-identification code may use feature extractors, adversarial autoencoders, feature training loss, and the like to identify and track individual people. In some cases, human re-identification may include image processing, such as without limitation object recognition, feature detection, edge/corner detection, such as edge-detection algorithm 136, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms, discussed above.

Continuing to reference FIG. 1, detecting an event 112 further includes tracking a ball in video footage 108. As discussed above, events may be detected as a result of collisions with a ball. Tracking a ball may include using a ball tracker 120. A ball tracker 120 may be a machine-learning model consistent with any machine-learning model as discussed herein. Ball tracker 120 may be built using training data that includes a plurality of labeled balls from video footage. A ball may include a tennis ball, ping pong ball, pickleball, and the like. Ball tracker 120 may receive an input of video footage 108 and output a labeled ball for every frame of video footage 108. Essentially, ball tracker 120 may track a ball throughout video footage 108. Tracking a ball may include tracking when a ball collides with other objects, such as a racquet, net, the ground, or the like. Additionally, ball tracker 120 may determine a position of a ball by using one or more proceeding frames to determine the position of the ball in the current frame. As a non-limiting example, ball tracker 120 may identify an approximate location for the ball based on where the ball was located in the one or more proceeding frames. This may aid the ball tracker in identifying the actual position of the ball by narrowing down the portion of the current frame where the ball could be located.

Continuing to reference FIG. 1, processor 104 may determine a player shot 124. As used herein a "player shot" is a collision between a ball and a player/an object a player is holding. A player shot 124 includes a collision between a ball and a racquet of a player. In an embodiment, processor 104 may determine a player shot 124 using data gathered from ball tracker 124 and player machine-learning model 116. A player shot 124 may be logged as an event 112 when processor 104 detects that a ball and a player are close together. For example, a player shot may be logged when a ball is in contact with an object a player is holding. In another embodiment, a player shot may be logged when a ball is redirected by or near an object a player is holding. A player shot 124 may be player specific, such that processor 104 may record player shots 124 for each player in video footage 108. Additionally or alternatively, processor may use a shot machine-learning model 128 to determine player shots 124. Shot machine-learning model 128 may be trained with training data that includes labeled player shots from a plurality of video footage. In an embodiment, shot machine-learning model 128 may use data outputted from ball tracker 120 and/or player machine-learning model 116 to determine player shots 124. For example, shot machine-learning model 128 may use the position of the ball, determined by ball tracker 120 and the positioning of a player, determined by player machine-learning model 116, to output a player shot 124. A player shot 124 may be identified by shot machine-learning model 128 based on a pose of a player. Typically, players may have a defining stance that occurs before hitting a ball. This may be combined with the positioning of the ball, wherein the ball must be near the player, to determine a player shot 124. Additionally, processor 104 may identify a player shot 124 based on the coordinates of the ball and an object a player is holding. The object a player is holding may be a hitting object. As used herein a "hitting object" is an object used to hit a ball, such as a racquet, paddle, bat, or the like. For example, if coordinates of the ball and the hitting object are equivalent or similar, processor 104 may identify that there has been a player shot 124.

With continued reference to FIG. 1, additionally, in some embodiments, processor 104 may recognize when a player shot 124 is a serve. As used herein, a "serve" is a type of player shot that marks a start of a rally. A "rally" is an exchange of strokes in a court game, which ends when one side fails to return the ball. Shot machine-learning model 128 may be trained with training data that further labels collisions in video footage as serves. Training data may include a multitude of labeled serves in a multitude of videos. A serve may be identified based on body positioning of a player. For example, in a serve, a ball may be located in the hand of a player before player hits the ball. Additionally, a player may jump, raise a racquet above their head, or the like to serve a ball. Such body positions may be used by processor 104 to determine a serve. Alternatively, a serve may be identified as the first collision between a ball and a racquet after a stop in action. A stop in action is a portion of video footage 108 wherein the players are not participating in a rally.

Still referencing FIG. 1, processor 104 may be configured to recognize ball height. In an embodiment, processor 104 may recognize ball height at the time of a player shot. Processor 104 may use a LiDAR system 132 of visual device 106 to determine height of objects. In an embodiment, video footage 108 may contain data from a LiDAR system 132 of the objects in video footage 108. LiDAR system 132 may create a 3D model of objects using a laser light sent from a transmitter and reflected from objects within video footage 108. Reflected light may be detected by a receiver in the LiDAR system 132 and the time to receive reflected light may be used to develop a distance map of objects within video footage 108. Additionally or alternatively, processor 104 may use image analysis tools to determine ball height in the frame wherein the player shot 124 occurs. This may be done retroactively, as LiDAR data is captured during the capturing of video footage 108. Image analysis may include determining the height of a ball based on edge detection, as discussed below. Edge detection may be used to determine the edges of a ball as to avoid errors in determining height. Such errors may include mistaking other objects as part of a ball and miscalculating height. Additionally, image analysis may include using projective geometry, wherein a reference plane, a vanishing point, and the like may be used. A reference plane may be a known plane, such as the horizontal ground. Image analysis may include using a reference height, which in the case of a pickleball game, may be the height of the net, which is standard. A reference height, as used herein, is a known height. Examples of reference heights may include standard heights of nets (tennis nets, pickleball nets, and the like), standard width and length of the game field (tennis court, pickleball court, and the like), and the like. Reference height may also be a known height and/or an average height of a player. Using the reference height, the reference plane, and a vanishing point, any height from the ground plane may be computed using geometric construction and projections. Additionally, processor 104 may factor in radial distortion of visual device 106 into geometric calculations. Image analysis may include determining distances using pixels. For example, processor 104 may determine the distance from the ground to the ball in pixels and measure the height of a player in pixels. The ball height may be determined as a proportion of the height of a player. Height of a player may be the average height of a player, for example 5'8". Alternatively or additionally, height of a player may be inputted as a user input to processor 104.

Still referring to FIG. 1, processor 104 may include an edge-detection algorithm 136, which may detect one or more shapes defined by edges. An "edge detection algorithm," as used in this disclosure, includes a mathematical method that identifies points in a digital image at which the image brightness changes sharply and/or has discontinuities. In an embodiment, such points may be organized into straight and/or curved line segments, which may be referred to as "edges." Edge detection may be performed using any suitable edge detection algorithm 136, including without limitation Canny edge detection, Sobel operator edge detection, Prewitt operator edge detection, Laplacian operator edge detection, and/or Differential edge detection. Edge detection may include phase congruency-based edge detection, which finds all locations of an image where all sinusoids in the frequency domain, for instance as generated using a Fourier decomposition, may have matching phases which may indicate a location of an edge. Edge-detection algorithm 136 may be used to detect a ball, a person, a net, or the like. Edge-detection algorithm 136 may be used in ball tracker 120, player machine-learning model 116, shot machine-learning model 128 and the like.

Still referring to FIG. 1, processor may be configured to generate a classifier, such as a player classifier (for the player machine-learning model) or a shot classifier (for the shot machine-learning model), using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements. With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Continuing to reference FIG. 1, processor 104 is configured to translate video footage 108 into a database 140. "Translating video footage", as used herein, refers to storing data determined by the aforementioned machine-learning models and the like into a database. Database may be implemented, without limitation, as a relational database, a key-value retrieval database such as a NOSQL database, JSON database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In an embodiment, when an event 112 is detected used machine-learning models as discussed above, it may be stored in database 140 with a time stamp. As used herein, a "time stamp" is a datum of the time of occurrence of a particular event. For example, a time stamp may be time that event 112 occurred. Time may be recorded as the time of day an event 112 occurred and/or a time in the video of video footage 108 that event 112 occurred. Data points such as player shot 124, ball height, player location, and the like may be stored along with a given event 112. Data points may also include velocity of the ball, identifiers of each player in the game, and the like. In an embodiment, there may be 15000 data points per one hour of video footage 108. In another embodiment, there may be 100000 data points per one hour of video footage 108.

Still referencing FIG. 1, processor 104 is configured to convert data in database 140 into a data representation 144 to be displayed to a user. A user may be an operator of apparatus 100 such as a players in video footage 108, a manager of a sports team, a viewer of a sports game, and the like. As used herein, a "data representation" is a presentation of data collected by a processor. Data representation 144 may be an auto-cropped video 146 of video footage 108. As used herein, an "auto-cropped video" is a video that has non-gameplay time removed. Non-gameplay time may be time in video footage 108 wherein events 112 are not occurring or about to occur. For example, non-gameplay time may be time wherein the players in video footage 108 are standing around, taking a break, taking a time out, and the like. Additionally, non-gameplay time may include the time between rallies. Additionally, in some embodiments, data representation 144 include an auto-highlights video 147. As used herein, an "auto-highlights video" is a video that only includes highlights. As used herein, "highlights" are outstanding parts of an event. Highlights may include exciting points, such as a rally that is particularly exciting. Auto-highlights may be determined using a highlights machine-learning model 148 that assigns a highlights score 152 to each rally, portion of rally, shot, and the like, to determine exciting points. Additionally, data representation 144 may include auto-scorekeeping 154, wherein a score is displayed to a user. As used herein "auto-scorekeeping" is information on a score of a game based on raw footage. Scorekeeping may be extracted from information determined by previously discussed machine-learning models such as ball tracker 120 and the like. Data representation 144 may also include auto-skill rating. As used herein, "auto skill rating" is information on the skills of a player. Data representation 144 may also include statistics created by data points tracked and stored in database 140. Data representation 144 may also include an action path 162 for a player in video footage 108. Data representations 144 are described in detail below.

Data representation 144 may be shown to a user by way of a display or display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. A graphical user interface may be displayed on a display device. In some embodiments, the GUI may be generated by apparatus 100. A graphical user interface (GUI) may include a plurality of lines, images, symbols. Display device may be communicatively connected to processor 104.

Still referencing FIG. 1, processor 104 may generate an auto-cropped video 146. Auto-cropped video may be generated by taking frames of video footage 108 wherein a ball is present, which is determined by ball tracker 120, and compiling the frames. This may include identifying a plurality of temporal sections of video footage 108. As used herein, a "temporal section" is a clip of a video file that is marked by a start and end time of the whole video file. A plurality of temporal sections 156 may be identified using a neural network, discussed in further detail in FIG. 3. A neural network may be trained to output temporal sections of the video file. A temporal section 156 may be user defined such that a user may input into a processor, temporal sections of a video file. A temporal section may be defined in any other way is contemplated within the scope of this disclosure. For example, temporal sections 156 may be defined by sections of the video wherein a ball is on the court. Additionally, or alternatively temporal sections 156 may be defined by a rally. Neural network may be training by inputting training examples of videos partitioned by hand, wherein the start of the temporal section is the start of a rally and the end of the temporal section is the end of a rally. Neural network may be trained to recognize the start of a temporal section 156 by a serve and the end of a temporal section 156 by the end of a rally, such as the ball colliding with the ground more than once or the ball colliding with the ground outside the bounds of the court. Temporal sections 156 may be compressed to be assembled into an auto-cropped video. Video compression algorithms are discussed above. Temporal sections 156 may be spliced together in the order of which they occurred. For example, an earliest rally would be shown first and the latest rally would be shown last.

Continuing to reference FIG. 1, processor 104 may be configured to generate auto-highlights video 147 (also referred to as auto-highlights). Auto-highlights 147 may be generated by scoring temporal sections 156 of video footage 108. Temporal sections may include each rally of the game in video footage 108. A highlights machine-learning model 148 may be used to generate highlights score 152, which may be used to splice together a highlights video. Highlights machine-learning model 148 may be trained with training data that includes temporal sections 156 of games that have been scored. Highlights machine-learning model 148 may include inputs of temporal sections and outputs of highlights score 152. A user may determine how exciting or boring a temporal section is and highlights machine-learning model may use that as training data to score temporal sections. For example, highlights machine-learning model 148 may use the volume of cheering to determine that a temporal section 156 is more exciting than a temporal section with no cheering. Highlights score 152 may be determined using linear regression models, as discussed below. Highlights machine-learning model 148 may be consistent with any machine-learning model as discussed herein. Highlights-machine learning model 148 may be trained using previous inputs and outputs of highlights machine-learning model 148 such that highlights machine-learning model 148 is iterative. Highlights score 152 may be a numerical score such as 3.7, 6.8, 10, 2, or the like. Highlights score 152 may be a score from 1-10, wherein 10 is an exciting rally and 1 is a boring rally. After all the temporal sections are ranked, they may be arranged by most exciting to least exciting. Temporal sections 156 may be compressed to be assembled into an auto-highlights video 147, which is a data representation 144. Video compression algorithms are discussed above.

Continuing to reference FIG. 1, processor 104 may generate a data representation 144 of auto-scorekeeping 154. Using the temporal sections 156 identified in video footage 108, processor 104 may determine a score for the game. Using ball tracker 120, processor 104 may determine on which side the ball ended at the end of a rally. In an embodiment, the players on the opposite side of the court from which the ball ended get a point added to the score. The score may be tallied and displayed to a user in real time. For example, after each rally, a point may be added to the score to show which team in the game is winning. The score may be displayed on a GUI, as discussed above.

Still referencing FIG. 1, processor 104 may generate a rating 158 for a player. As used herein, a "rating" is a score for a skill level of a user. A rating may be a numerical rating ranging from 1-10, wherein 1 is low skill, and 10 is high skill. Skill level of a user may be evaluated using a skills machine-learning model 160. Skills machine-learning model 160 may be consistent with any machine-learning model as discussed herein. Skills machine-learning model 160 may include an input of video footage 108 and/or data in database 140 and an output of a skills rating 158 for a given player. Skills machine-learning model 160 may include a classifier and/or clustering algorithm to classify skills associated with a player. Skills to be matched to may be predetermined, such as by an operator of apparatus 100. As used herein, a "skills" is a beneficial attribute of a player, relating to their attributes within video footage 108. For example, a skill category may be serve strength, dink strength, overhead strength, lob strength, or the like. Skills may be related to net sports. Skills may be detected by a classification algorithm that uses training data that includes identified skills based on previously classified data relating to video footage 108. Skills machine-learning model 160 may include training data that was obtained from previous iterations of skills machine-learning model 160, such as previously classified skills based on different video footage/data in a database.

Continuing to reference FIG. 1, each player within video footage 108 may be assigned rating 158 based on the skill level of the player. For example, the video footage 108 and/or data in database 140 may be match to skills including a strong dink and a fast serve, or the like. The skill may be scored with a numerical integer between 1-10, wherein 10 is the total mastery of a skill. The scoring of a skill may be determined using a scoring function as described below. The scoring of skills may be used to determine an action path 162 needed for a user to improve in the game that they are participating in (such as pickleball, tennis, etc.). For example, if a user 112 receives a 2 as the score for a skill of serving, they may be presented with entry level courses serving a ball as part of their action path 162. Alternatively, if a user 112 receives an 8 as their score for a kitchen shot execution, they may be presented with advanced level courses related to the improving pickleball shots as part of their action plan 162. The combination of skill scores may be weighted and averaged to determine a rating 158 of a player. Rating 158 may be presented to a player by way of a display.

A skill may alternatively or additionally be determined by calculating a proficiency score relating to a skill. Proficiency score may be compared to a threshold and/or to a level associated with the skill and/or objective and/or a peer cohort of player. A "peer cohort," as used in this disclosure, is a group of persons having one or more characteristics in common with player, including without limitation geographic location of residence, ability level relating to the sport in video footage, age, ethnicity, sex and/or gender, household income, language and/or languages spoken, and/or one or more skill and/or attribute level of proficiency besides the skill and/or attribute level of proficiency currently being determined, and/or any combination thereof. A peer cohort may be identified using a classifier, which may be trained according to data associating one or more user attributes and/or characteristics to persons for a plurality of persons. Clusters of players having similar attributes to one another may be identified using an unsupervised and/or clustering algorithm to identify such clusters in training data; proficiency scores may be averaged and/or arranged into percentiles and/or bins and/or categories such as clusters and/or fuzzy sets indicating relative levels of proficiency and/or ability within such groups. A proficiency score of player may then be sorted to a level, percentile, and/or fuzzy set associated with a skill, indicating that, e.g., regarding a skill associated with and/or identical to objective, user is below average for peer cohort, in a lower percentile for peer cohort, or in a fuzzy set associated with lower performance than typical or desired for peer cohort. Fuzzy sets, bins, and/or clusters may have parameters (as described in further detail below) and/or centroid locations tuned using any training data and/or machine learning associated with levels of proficiency scores within a cohort; for instance, a number of levels desired may be indicated (low, medium, high proficiency as a non-limiting example), then any clustering algorithm, unsupervised machine-learning process, or the like may be used to set centroids, parameters, or the like to represent each level of the number of levels.

With continued reference to FIG. 1, processor 104 may be configured to generate an action path 162 for a player based on their skills and rating 158. An "action path," as used herein, is a series of tasks, for the user to develop greater expertise or skills in their strengths. As used herein, a "series of tasks" are a number of actions a user can take. As used herein, a "task" is a job to be done and/or undertaken. In an embodiment, a task may include proposed courses, jobs, trainings, and the like. The combination of multiple tasks in succession may be an action path. For example, and without limitation, an action path 162 for a pickleball player may include improving serves, practicing volleys, and the like, based on what their identified skills are. An action path 162 may be used to help a player develop greater expertise in their strength and/or improve their weaknesses. For example, if a player scores low on a skill of establishing points in the kitchen, an action path 162 may be created to improve the player's pickleball skills, such as improving their volley, and the like. In an embodiment, an operator of apparatus 100 may predetermine actions paths 162 for players to take based on their scores for each skill category.

Continuing to refer to FIG. 1, processor 104 may generate a plurality of statistics 164 as a function of database 140. As discussed above, database 140 may store a plurality of data points relating to the collision of a ball with another object. Based on data such as which player hit the ball, how many times the ball was hit in a rally, and the like, a plurality of statistics may be generated. In an embodiment, statistics 164 may include longest rally, an average length of rally, total points won for each team of players, points won on a serve, points won on return, kitchen points won, serve-side points won before establishing in kitchen, serve-side points lost before establishing in kitchen, serve-side points successfully established in kitchen, and the like. Statistics 164 may also include percentages of balls hit by a given player, a display of where the ball was hit by a player, balls hit with backhand, and the like. Statistics 164 may be generated and displayed as a table, a bar diagram, a pie chart, a scatter plot, and the like. An operator of apparatus 100 may select various data points to compare and display on a graph. An operator of apparatus 100 may select a certain graph to display various data points on. An exemplary table of statistics 164 is shown below:

| | Combined Games Summary | |
|---|---|---|
| Todd & CT | | Steve & Jeff |
| | Longest Rally: 16 | |
| | Average Length of Rally: 7.3 | |
| 37 | Total Points Won | 35 |
| 18 | Points Won on Serve | 22 |
| 19 | Points Won on Return | 13 |
| 14 | Kitchen Points Won | 12 |
| 8 | Serve-Side Points Won Before Establishing in Kitchen | 10 |
| 19 | Serve-Side Points Lost Before Establishing in Kitchen | 20 |
| 7 | Serve-Side Points Successfully Established in Kitchen | 8 |

Figure 2:
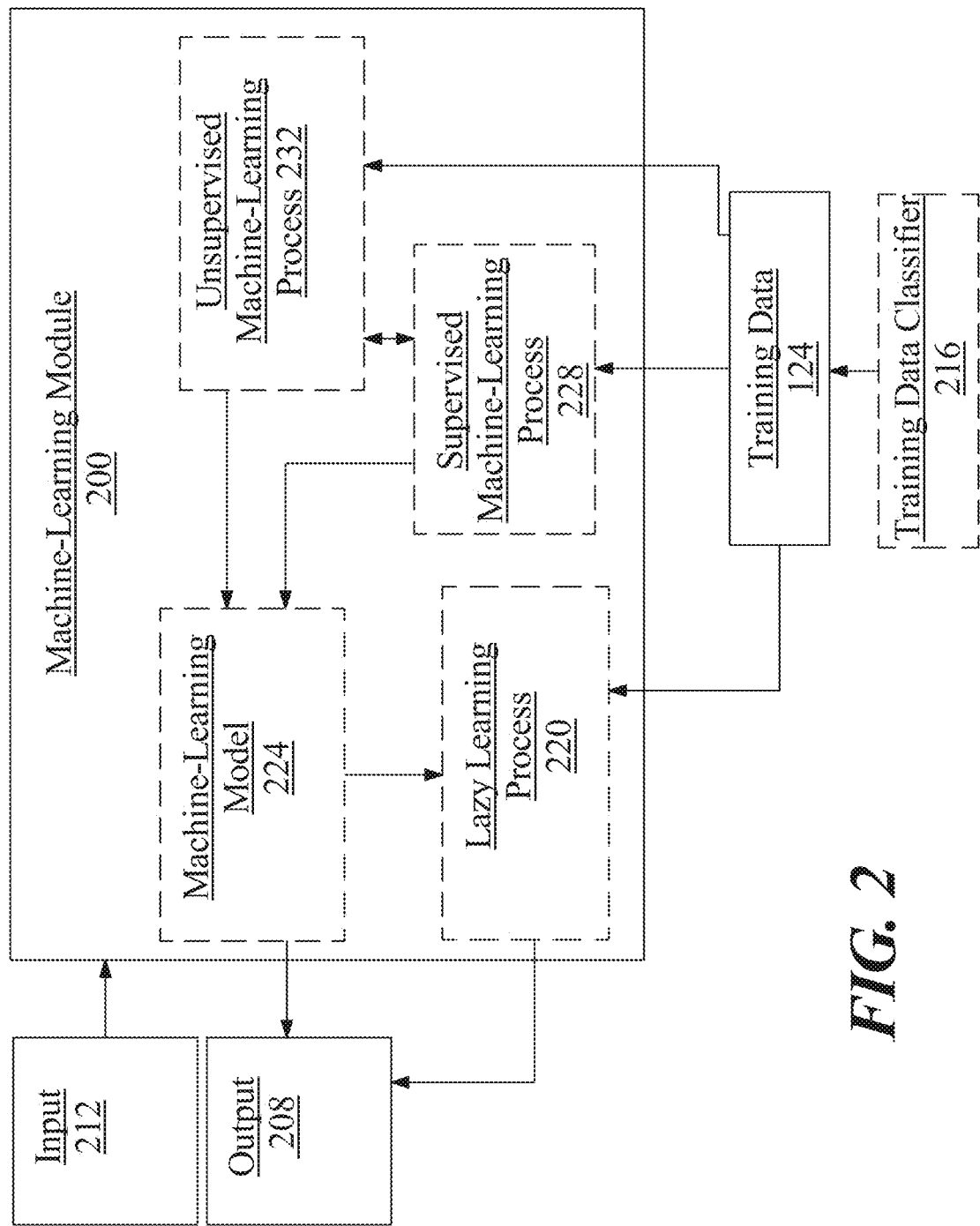
FIG. 2 is a block diagram of an exemplary embodiment of a machine-learning module.

Referring now to FIG. 2, an exemplary embodiment of a machine-learning module 200 that may perform one or more machine-learning processes as described in this disclosure is illustrated. A "machine learning process," as used in this disclosure, is a process that automatedly uses machine-learning training dataset 204, as described above, to generate an algorithm that will be performed by a computing device/module to produce outputs 208 given data provided as inputs 214; this is in contrast to a non-machine learning software program where the commands to be executed are determined in advance by a subject and written in a programming language.

Alternatively or additionally, and continuing to refer to FIG. 2, machine-learning training dataset 204 may include one or more elements that are not categorized; that is, machine-learning training dataset 204 may not be formatted or contain descriptors for some elements of data. Machine-learning algorithms and/or other processes may sort machine-learning training dataset 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same machine-learning training dataset 204 to be made applicable for two or more distinct machine-learning algorithms as described in further detail herein. Machine-learning training dataset 204 used by machine-learning module 200 may correlate any input data as described in this disclosure to any output data as described in this disclosure.

Further referring to FIG. 2, machine-learning training dataset 204 may be filtered, sorted, and/or selected using one or more supervised and/or unsupervised machine-learning processes and/or models as described in further detail herein; such models may include without limitation a training data classifier 216. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from machine-learning training dataset 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to elements that characterizes a sub-population, such as a subset of compatible alimentary elements based on meal-type (breakfast, lunch, dinner), ingredient lists, diet type, time of selection, and the like, and/or other analyzed items and/or phenomena for which a subset of training data may be selected.

Still referring to FIG. 2, machine-learning module 200 may be configured to perform a lazy-learning process 240 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of machine-learning training dataset 204. Heuristic may include selecting some number of highest-ranking associations and/or machine-learning training dataset 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail herein.

Alternatively or additionally, and with continued reference to FIG. 2, machine-learning processes as described in this disclosure may be used to generate machine-learning models 244. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 244 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 244 may be generated by creating an artificial neural network, such as a convolutional neural network comprising an input layer of nodes, one or more intermediate layers, and an output layer of nodes. Connections between nodes may be created via the process of "training" the network, in which elements from a machine-learning training dataset 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 248. At least a supervised machine-learning process 248, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a alimentary profile 140 and an alimentary element program 108, as described above as inputs, accuracy parameters as outputs, and a ranking function representing a desired form of relationship to be detected between inputs and outputs; ranking function may, for instance, seek to maximize the probability that a given input and/or combination of elements inputs is associated with a given output to minimize the probability that a given input is not associated with a given output. Ranking function may be expressed as a risk function representing an "expected loss" of an algorithm relating inputs to outputs, where loss is computed as an error function representing a degree to which a prediction generated by the relation is incorrect when compared to a given input-output pair provided in machine-learning training dataset 204. Persons skilled in the art, upon reviewing the entirety of this disclosure, will be aware of various possible variations of at least a supervised machine-learning process 248 that may be used to determine relation between inputs and outputs. Supervised machine-learning processes may include classification algorithms as defined above.

Further referring to FIG. 2, machine learning processes may include at least an unsupervised machine-learning processes 224. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 244 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 2, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a machine-learning training dataset 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using machine-learning training dataset 204.

Figure 3:
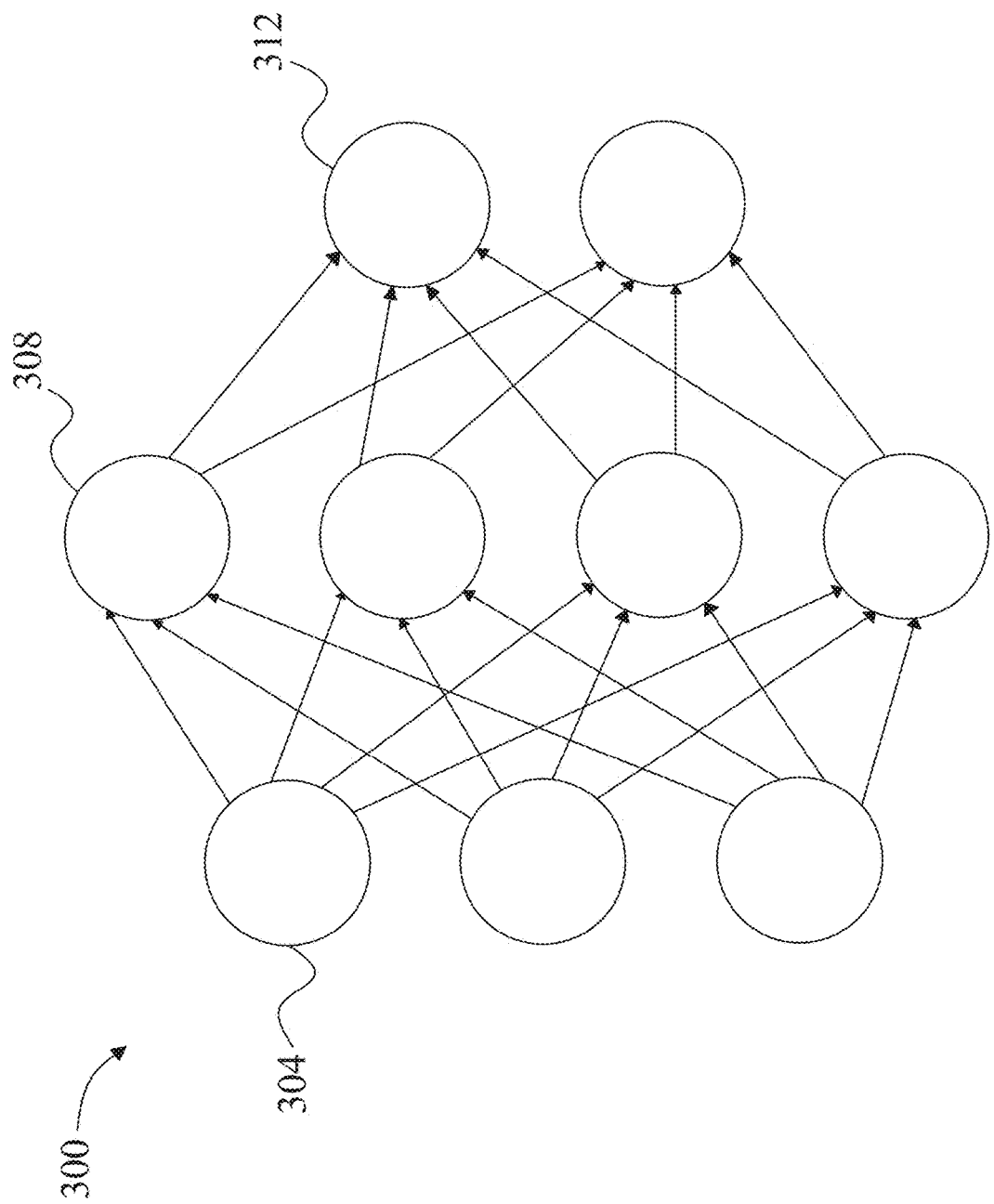
FIG. 3 is a block diagram of an exemplary embodiment of a neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
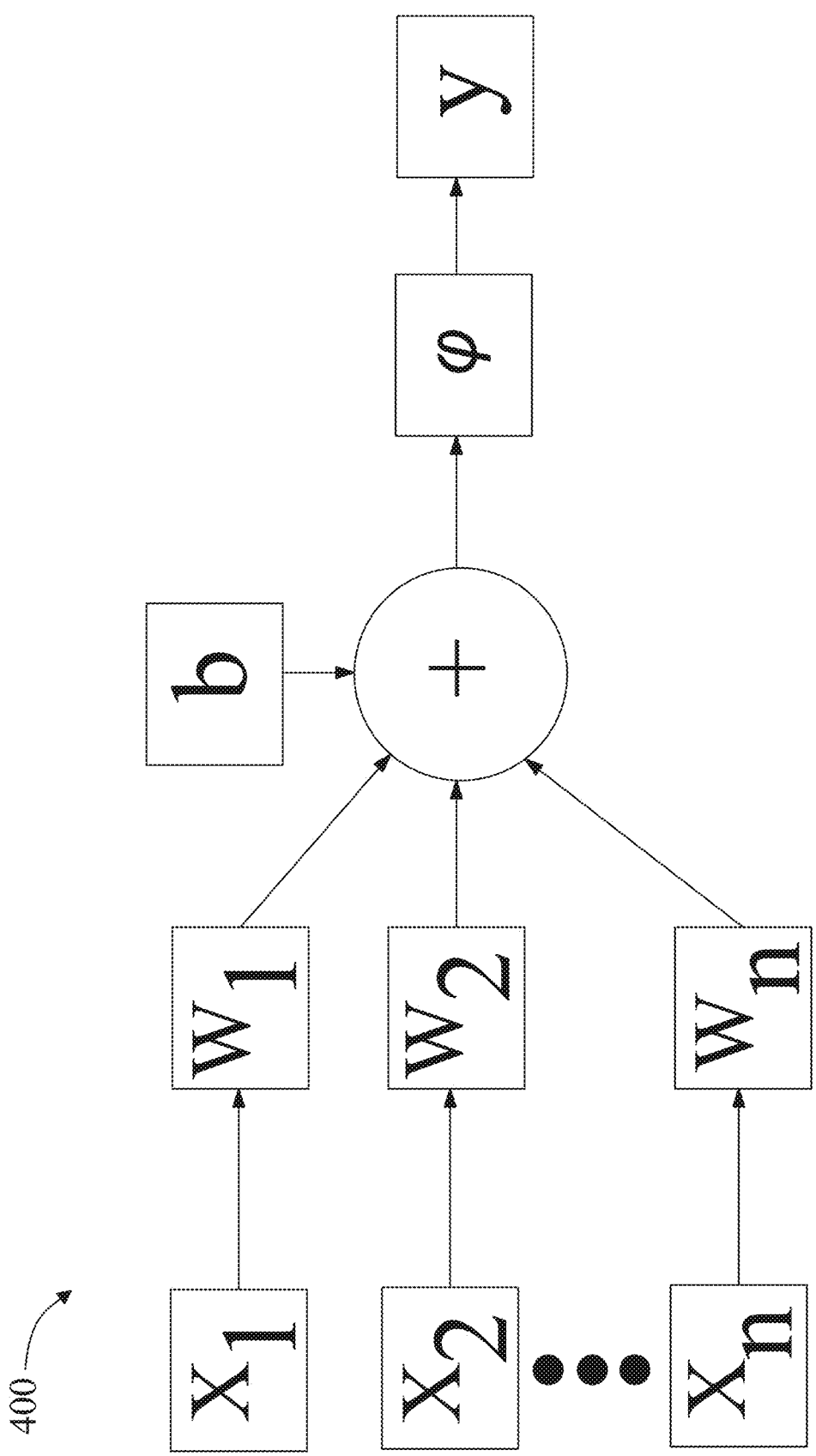
FIG. 4 is a block diagram of a node of a neural network.

Referring now to FIG. 4, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5A:
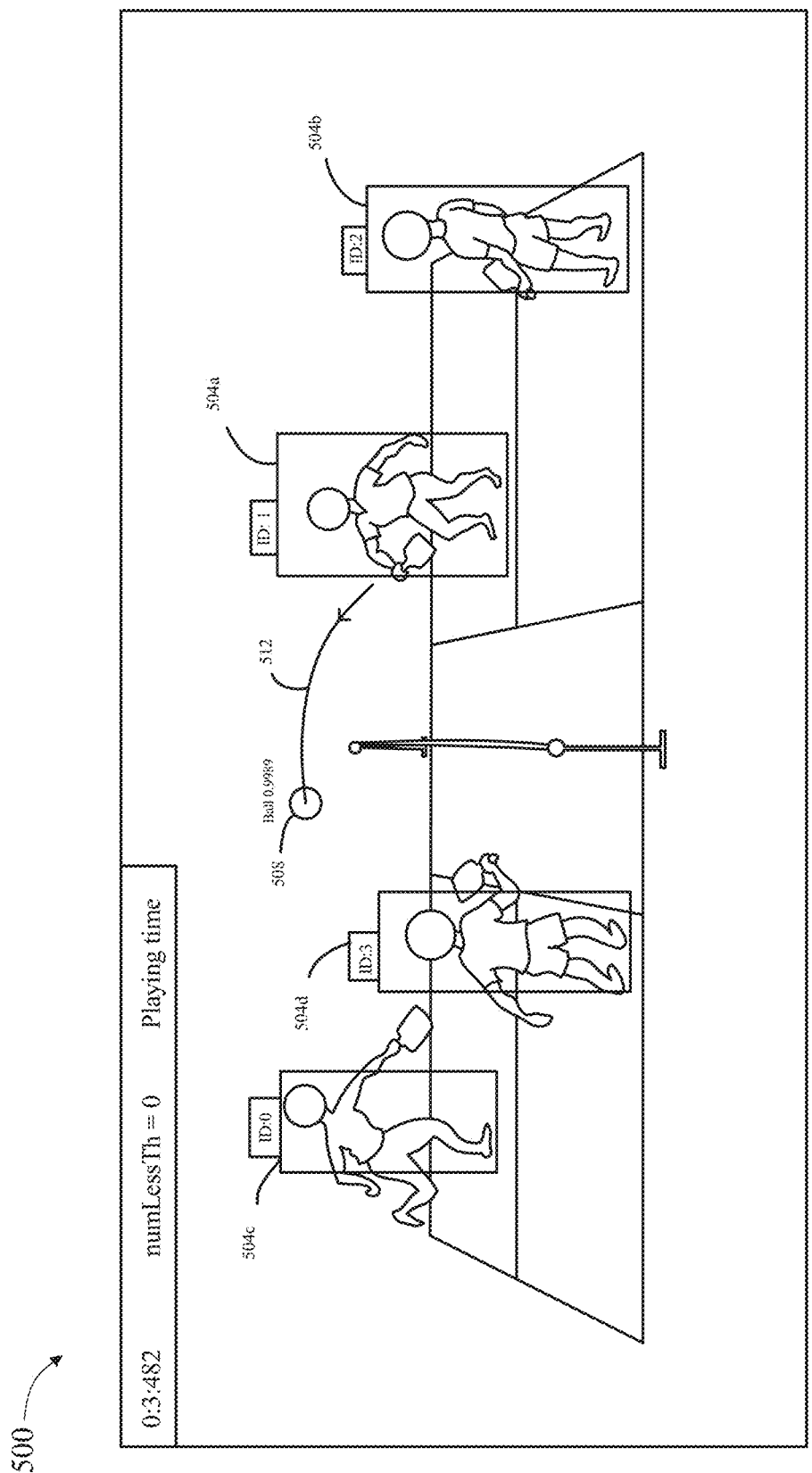
FIGS. 5A and B are a side views from a visual device of a match.

Now referring to FIG. 5A, an exemplary view of a match from visual device 106 is shown. FIG. 5A shows a side view 500 of a frame of a video. In this case, video is of a pickleball match. Video may be part of video footage, such as video footage 108. Each player may be identified and assigned an identifier 504a-d. Each player may be identified using methods as discussed above, such as human reidentification code. Each player may be tracked throughout the video, with a player tracker algorithm, as discussed above. A ball 508 may be identified and tracked. Ball 508 may be tracked through a plurality of frames of a video. A ball trajectory 512 may be displayed on the frame to show a path of ball 508. A "ball trajectory" is a tracking line that shows the locations that an object has been in previously.

Figure 5B:
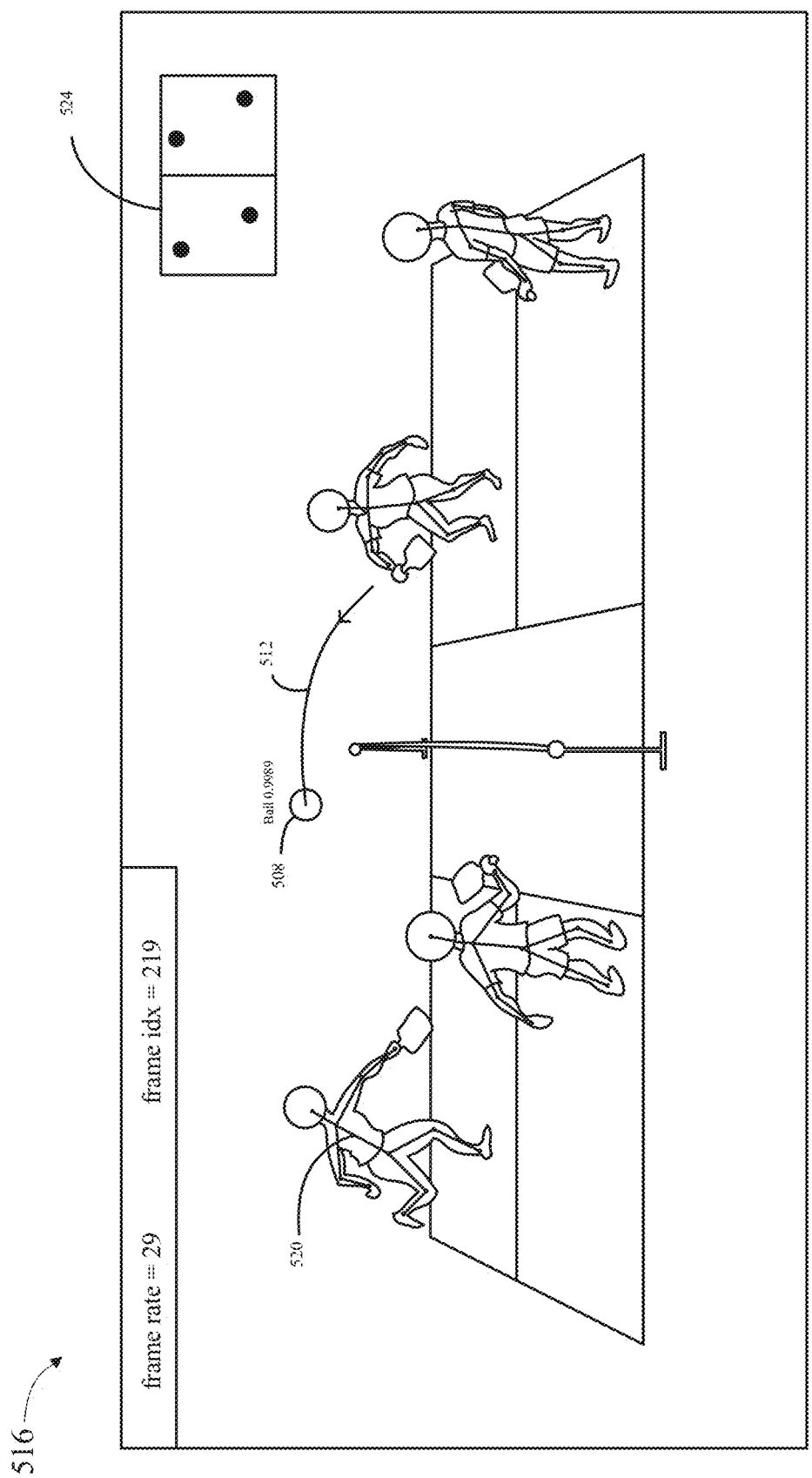

Now referring to FIG. 5B, a side view 516 of a frame of a pickleball match video. Side view 516 shows a player pose skeleton 520 overlayed on the players in the video. In this side view 516, ball 508 is tracked throughout the previous frames and a ball trajectory 512 is displayed as a result. On the top right of the frame, a display 524 of player locations is displayed. Player locations may be determined using methods as discussed above, such as player machine-learning model 116.

Figure 6:
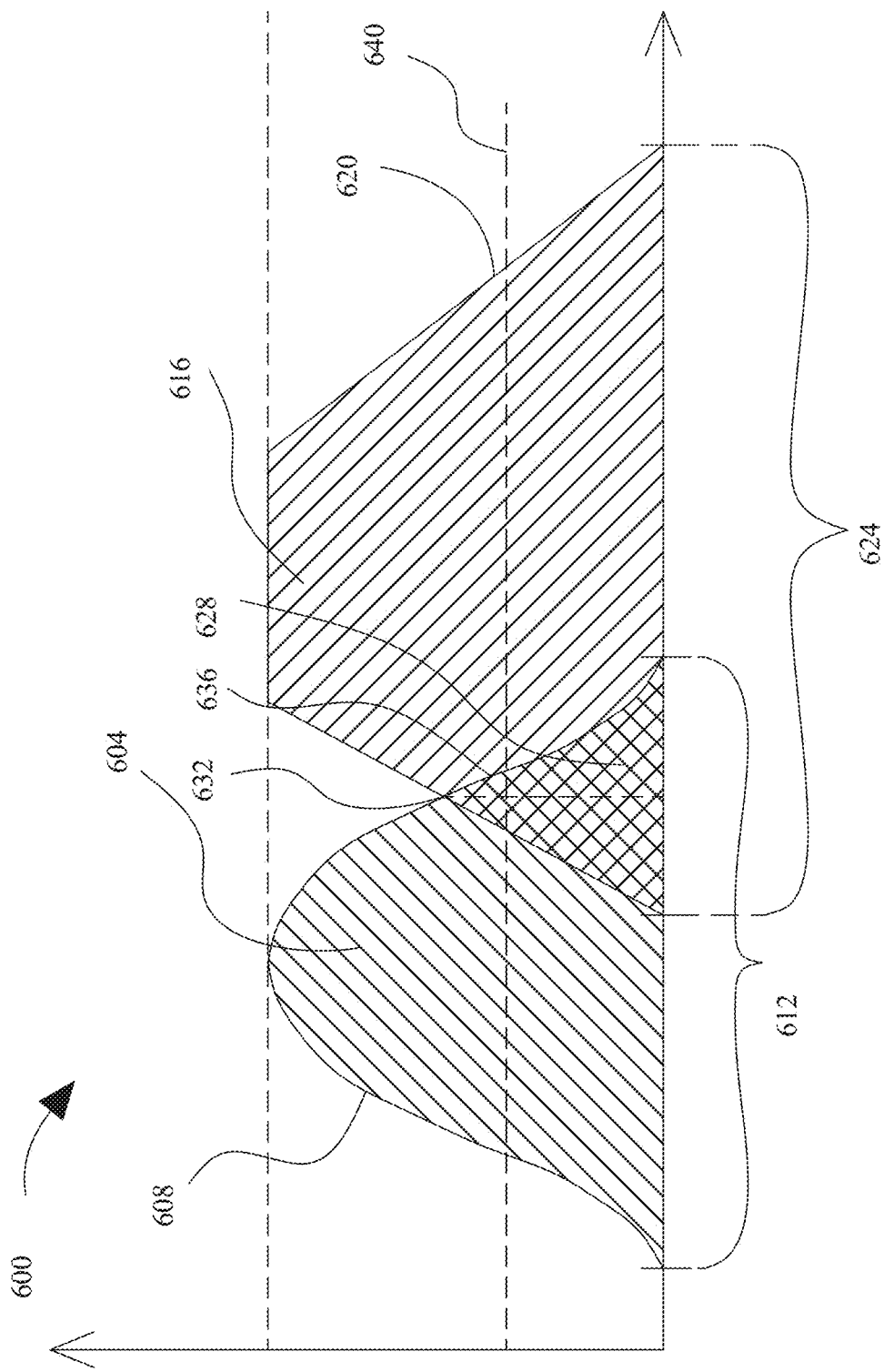
FIG. 6 is an exemplary embodiment of fuzzy set comparison.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \{0, \text{ for } x > c \text{ and } x < a$$
$$\frac{x-a}{b-a}, \text{ for } a \leq x < b$$
$$\frac{c-x}{c-b}, \text{ if } b < x \leq c$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models and/or a predetermined class. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 672 representing a probability, as defined on probability interval, of a match between first fuzzy set 604 and second fuzzy set 616. Alternatively or additionally, a single value of first and/or second fuzzy set may be located at a locus 676 on first range 612 and/or second range 624, where a probability of membership may be taken by evaluation of first membership function 608 and/or second membership function 620 at that range point. A probability at 628 and/or 672 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or a predetermined class for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify any data described as classified above. For instance, if a proficiency score or the like has a fuzzy set and/or value matching fuzzy set by having a degree of overlap exceeding a threshold, computing device 104 may classify the proficiency score as belonging an associated categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an element of data may be compared to multiple fuzzy sets. For instance, the element of data may be represented by a fuzzy set that is compared to each of the multiple fuzzy sets representing, e.g., values of a linguistic variable; and a degree of overlap exceeding a threshold between the datum-linked fuzzy set and any of the multiple fuzzy sets may cause computing device to classify the datum as belonging to each such categorization. Machine-learning methods as described throughout may, in a non-limiting example, generate coefficients used in fuzzy set equations as described above, such as without limitation x, c, and a of a Gaussian set as described above, as outputs of machine-learning methods.

Still referring to FIG. 6, a computing device may use a logic comparison program, such as, but not limited to, a fuzzy logic model to determine an output and/or response. An output and/or response may include, but is not limited to, a proficiency level such as low, medium, advanced, superior, and the like; each such output and/or response may be represented as a value for a linguistic variable representing output and/or response or in other words a fuzzy set as described above that corresponds to a degree of completion as calculated using any statistical, machine-learning, or other method that may occur to a person skilled in the art upon reviewing the entirety of this disclosure.

Further referring to FIG. 6, an inference engine may be implemented according to input and/or output membership functions and/or linguistic variables. For instance, a first linguistic variable may represent a first measurable value pertaining to an element being input to the inferencing system, such as a proficiency score level, while a second membership function may indicate a degree and/or category of one or more other attributes and/or values that may be associated with a user and/or peer cohort. Continuing the example, an output linguistic variable may represent, without limitation, a value representing a strength and/or deficiency. An inference engine may combine rules, such as: "if proficiency score is average, and peer cohort level is below average, skill is a strength"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 7:
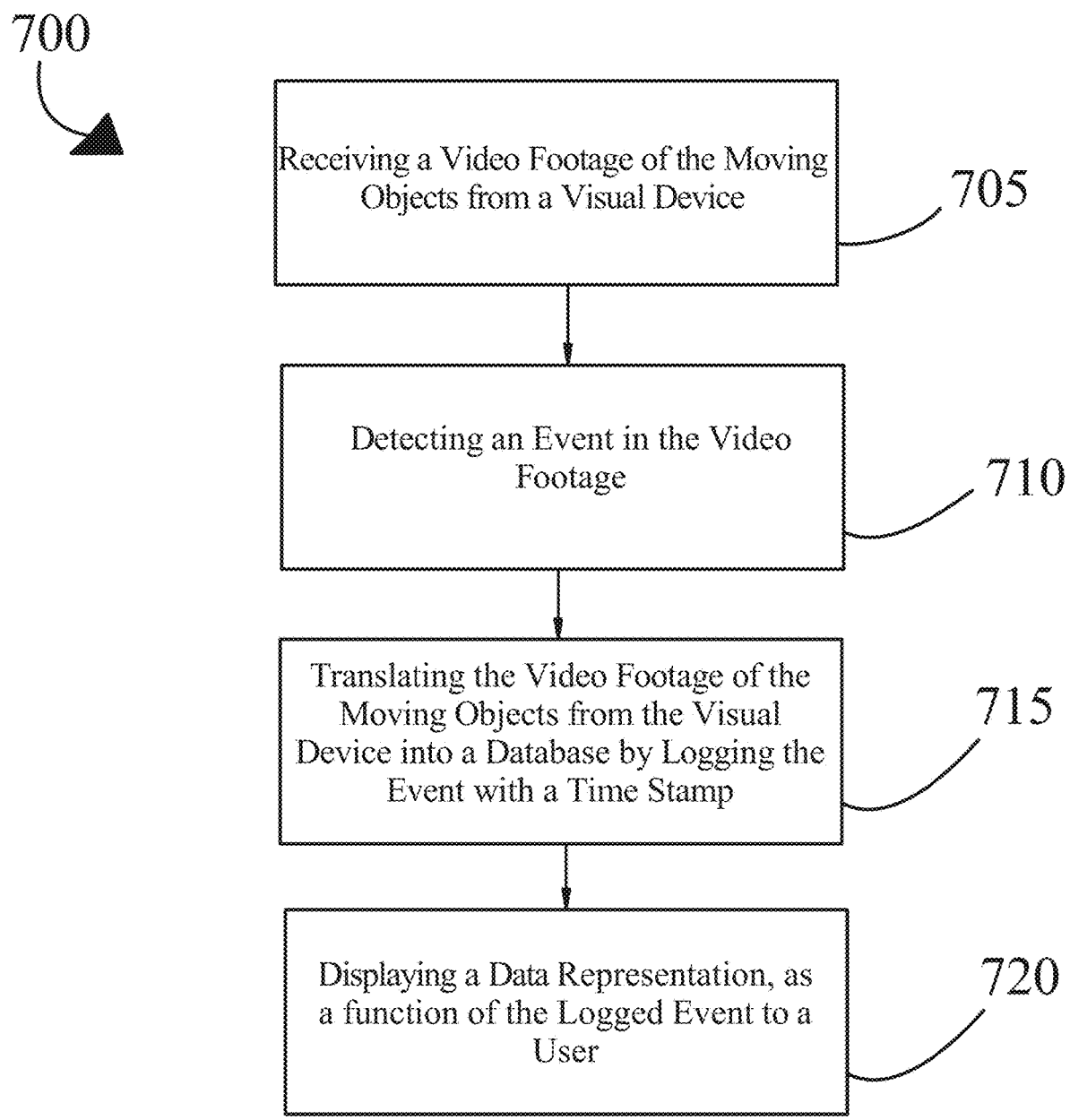
FIG. 7 is a flow diagram of a method for image classification.

Now referring to FIG. 7, a method 700 for image classification of moving objects is shown. Step 705 of method 700 includes receiving, by a processor, a video footage of the moving objects from a visual device, wherein the video footage includes a net sport match. Video footage may be received from a side-view, back-view, corner-view, or top-view. This step may occur as described above in reference to FIGS. 1-6.

Step 710 of method 700 includes detecting, by the processor, an event in the video footage wherein the event includes a collision. The collision may occur whenever a ball in the video footage makes contact with another object. Detecting the event may further include tracking a player location. Tracking the player location may include utilizing human re-identification code and/or identifying a player pose skeleton. Detecting the event may further include determining a player that causes the collision in video footage. Detecting the event may further include recognizing a serve. Detecting the event may further include recognizing the height of the ball at the time of the collision. This step may occur as described above in reference to FIGS. 1-6.

Step 715 of method 700 may include translating, by the processor, the video footage of the moving objects from the visual device into a database by logging the event with a time stamp. Database may include a plurality of data points such as ball height, player that causes a collision with a ball, and the like, which is gathered with the detection of an event. This step may occur as described above in reference to FIGS. 1-6.

Step 720 of method 700 includes displaying, by the processor, a data representation to a user. Displaying the data representation may include displaying an auto-cropped video. A data representation may also include an auto-highlights video, an auto-skill rating, a display of a score, a graph, chart, table, and the like. This step may occur as described above in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
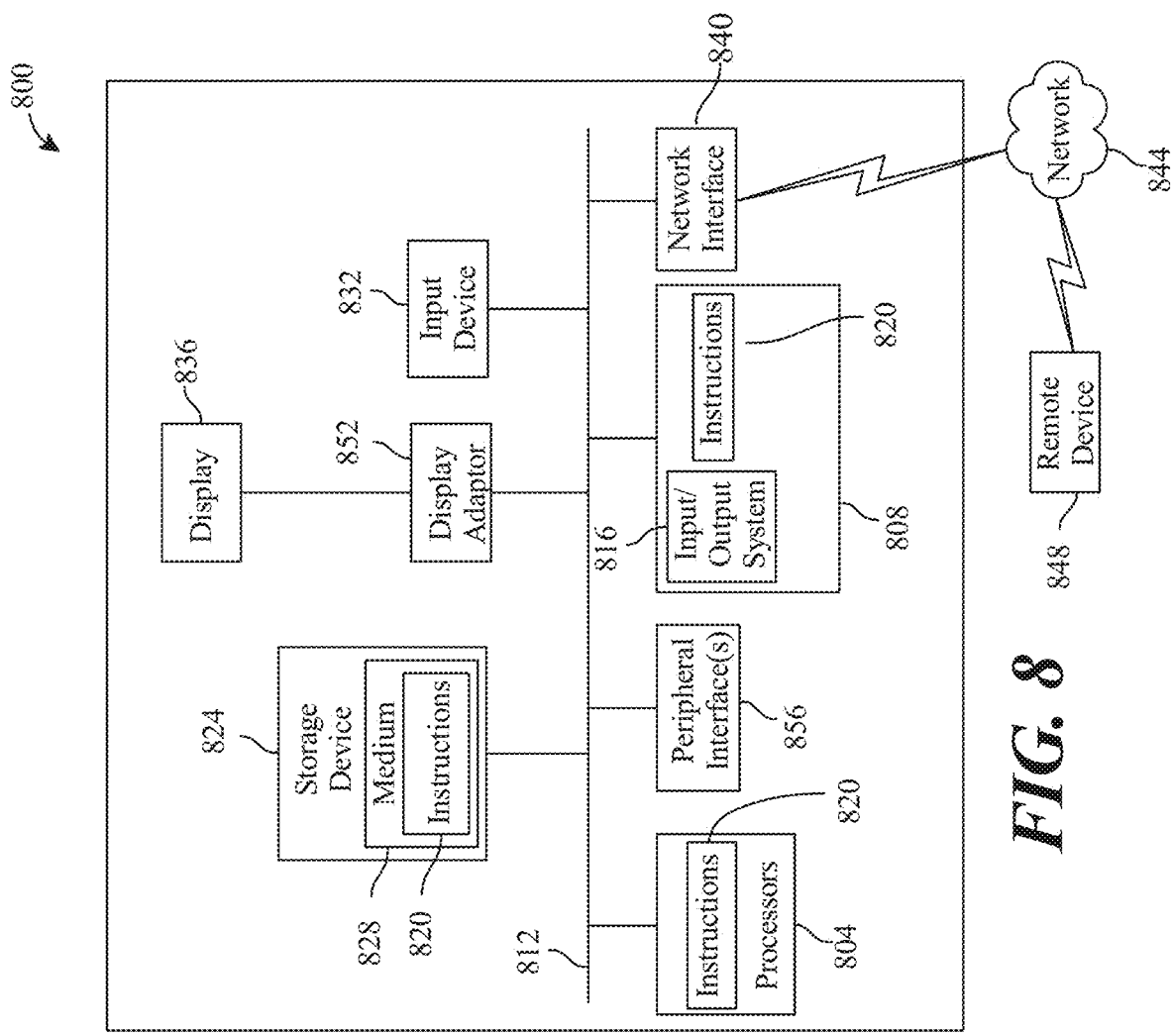
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 814. Bus 814 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 840 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 844. Examples of a storage device (e.g., storage device 844) include, but are not limited to, a hard disk drive, a magnetic disk drive, an optical disc drive in combination with an optical medium, a solid-state memory device, and any combinations thereof. Storage device 844 may be connected to bus 814 by an appropriate interface (not shown). Example interfaces include, but are not limited to, SCSI, advanced technology attachment (ATA), serial ATA, universal serial bus (USB), IEEE 1294 (FIREWIRE), and any combinations thereof. In one example, storage device 844 (or one or more components thereof) may be removably interfaced with computer system 800 (e.g., via an external port connector (not shown)). Particularly, storage device 844 and an associated machine-readable medium 848 may provide nonvolatile and/or volatile storage of machine-readable instructions, data structures, program modules, and/or other data for computer system 800. In one example, software 840 may reside, completely or partially, within machine-readable medium 848. In another example, software 840 may reside, completely or partially, within processor 804.

Computer system 800 may also include an input device 824. In one example, a user of computer system 800 may enter commands and/or other information into computer system 800 via input device 824. Examples of an input device 824 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 824 may be interfaced to bus 814 via any of a variety of interfaces (not shown) including, but not limited to, a serial interface, a parallel interface, a game port, a USB interface, a FIREWIRE interface, a direct interface to bus 814, and any combinations thereof. Input device 824 may include a touch screen interface that may be a part of or separate from display 826, discussed further below. Input device 824 may be utilized as a user selection device for selecting one or more graphical representations in a graphical interface as described above.

A user may also input commands and/or other information to computer system 800 via storage device 844 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 840, etc.) may be communicated to and/or from computer system 800 via network interface device 840.

Computer system 800 may further include a video display adapter 854 for communicating a displayable image to a display device, such as display device 826. Examples of a display device include, but are not limited to, a liquid crystal display (LCD), a cathode ray tube (CRT), a plasma display, a light emitting diode (LED) display, and any combinations thereof. Display adapter 854 and display device 826 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 814 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for image classification of moving objects, the apparatus comprising:
   a processor; and
   a memory communicatively connected to the processor, the memory containing instructions configuring the processor to:
      receive a net sport match video footage of a plurality of moving objects from a visual device, wherein the plurality of moving objects comprises at least a ball and one or more players;
      detect an event in the video footage, wherein the event comprises a collision;
      determine the one or more players of the plurality of moving objects; and
      display a data representation of the event to a user, wherein displaying comprises:
         receiving a plurality of temporal sections of the net sport match video footage related to the event and the one or more players;
         generating a highlights score for each temporal section of the plurality of temporal sections;
         ranking the plurality of temporal sections based on the highlights score; and
         generating auto-highlights video based on the ranked plurality of temporal sections.

2. The apparatus of claim 1, wherein the visual device comprises a camera.

3. The apparatus of claim 1, wherein video footage comprises a video taken from at least a back-view.

4. The apparatus of claim 1, wherein detecting the event comprises comparing a series of frames of the video footage to determine movement of each of the plurality of moving objects.

5. The apparatus of claim 4, wherein comparing the series of frames comprises video compression by inter-frame coding.

6. The apparatus of claim 1, wherein determining the one or more players comprises distinguishing humans from other moving objects within the video footage using a player machine-learning model.

7. The apparatus of claim 1, wherein the collision comprises the ball in the video footage contacting another object.

8. The apparatus of claim 1, wherein detecting the event further comprises tracking a location of the one or more players.

9. The apparatus of claim 8, wherein tracking a location of the one or more players comprises determining a location of a player on a court by identifying a player pose skeleton of each of the one or more players.

10. The apparatus of claim 8, wherein tracking a location of the one or more players comprises human re-identification.

11. The apparatus of claim 1, wherein the data representation comprises statistics created by data points of the video footage.

12. The apparatus of claim 11, wherein the data points comprise a velocity of the ball.

13. The apparatus of claim 11, wherein the data points comprise identifiers of the one or more players.

14. The apparatus of claim 11, wherein the data points comprise an action path of the one or more players.

15. A method for image classification of moving objects, the method comprising:

receiving, by a processor, a net sport match video footage of a plurality of moving objects from a visual device, wherein the plurality of moving objects comprises at least a ball and one or more players;

detecting, by the processor, an event in the video footage, wherein the event comprises a collision;

determining, by the processor, the one or more players of the plurality of moving objects; and displaying, by the processor, a data representation of the event to a user, wherein displaying comprises:

receiving a plurality of temporal sections of the net sport match video footage related to the event and the one or more players;

generating a highlights score for each temporal section of the plurality of temporal sections;

ranking the plurality of temporal sections based on the highlights score; and generating auto-highlights video based on the ranked plurality of temporal sections.

16. The method of claim 15, wherein the visual device comprises a camera.

17. The method of claim 15, wherein detecting the event comprises comparing a series of frames of the video footage to determine movement of each of the plurality of moving objects.

18. The method of claim 17, wherein comparing the series of frames comprises video compression by inter-frame coding.

19. The method of claim 15, wherein detecting the event further comprises tracking a location of the one or more players.

20. The method of claim 19, wherein tracking a location of the one or more players comprises determining a location of a player on a court by identifying a player pose skeleton of each of the one or more players.

* * * * *